United States Patent [19]

Mori et al.

[11] Patent Number: 4,618,830
[45] Date of Patent: Oct. 21, 1986

[54] PSK DEMODULATOR USING ASYNCHRONOUS LOCAL OSCILLATOR

[75] Inventors: Masaharu Mori; Ryuichi Asai, both of Tokyo, Japan

[73] Assignee: Clarion Co., Ltd., Tokyo, Japan

[21] Appl. No.: 681,597

[22] Filed: Dec. 14, 1984

[30] Foreign Application Priority Data

Jan. 9, 1984 [JP] Japan .................................. 59-1737

[51] Int. Cl.$^4$ ........................................... H04L 27/22
[52] U.S. Cl. .................................... 329/105; 329/124; 375/82; 375/84; 375/94
[58] Field of Search ................. 329/50, 105, 110, 122, 329/124; 375/80, 82, 83, 84, 94

[56] References Cited

U.S. PATENT DOCUMENTS

4,540,948  9/1985  Ryu .................................... 329/50 X

*Primary Examiner*—Siegfried H. Grimm
*Attorney, Agent, or Firm*—Russell E. Hattis; Lawrence J. Bassuk

[57] ABSTRACT

A PSK demodulator, by which a first output signal obtained from a local oscillator circuit working asynchronously with respect to the carrier phase of an inputted burst PSK signal and a second output signal shifted in phase by 90° with respect to the first output signal are multiplied by the inputted burst PSK signal by means of a first multiplier and a second multiplier, respectively. Each of the output signals from the first and second multipliers are compared with a first reference voltage and a second reference voltage, which is lower than the first reference voltage. The output signals are classified into 4 sorts of level signals, those which are higher than the first reference voltage and those which are lower than the second voltage; and thus the inputted burst PSK signal is demodulated by using these 4 sorts of level signals.

2 Claims, 8 Drawing Figures

PSK DEMODULATOR USING ASYNCHRONOUS LOCAL OSCILLATOR

BACKGROUND OF THE INVENTION

1. Field of the Invention

This invention relates to a PSK demodulator suitably applied to burst wave PSK signals.

2. Description of the Prior Art

PSK (Phase Shift Keying) is a phase modulation by means of digital signals and one of the simplest PSK systems is two-phase PSK system, by which 0 and 1 in digital signals correspond to 0° and 180° of the carrier phase. In order to reproduce digital signals from received PSK signals, it is sufficient to detect whether the carrier phase is for example 0° or 180°. For this purpose, a carrier phase reference is necessary, with which the received carrier phase is compared in order to know how much the carrier phase is shifted in fact with respect to the original carrier phase.

However, since it is difficult to prepare such a precise phase reference at the receiver side, usually information is sent by using, not absolute phase reference but phase variations. This system is called a DPSK (Differential Phase Shift Keying) modulation system. Demodulation of DPSK signals is effected for example by multiplying received DPSK signals by a carrier reproduced by any means.

Figure 1:
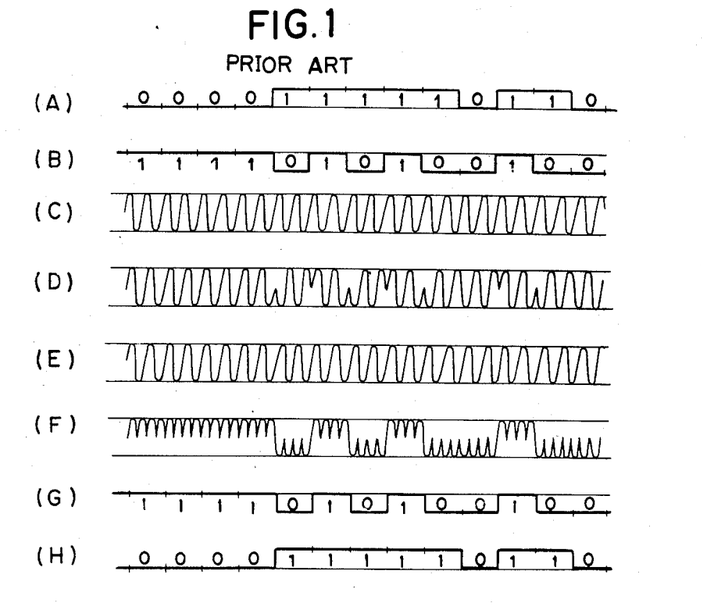
FIGS. 1 and 4 show waveforms for explaining the principle of the PSK demodulation.

FIG. 1 is a scheme showing the demodulation process for such DPSK signals in waveform, in which (A) shows a digital signal indicating information to be sent; (B) represents a modulating signal into which the digital signal (A) is transformed; (C) is a carrier which is to be transformed into a modulated signal; (D) shows a DPSK signal obtained by DPSK modulating the carrier (C) by the modulating signal (B); (E) is a carrier reproduced at the receiver side, which is identical to (C); (F) represents a demodulated information signal obtained by multiplying the DPSK signal (D) by the reproduced carrier (E); (G) indicates a modulated signal obtained by shaping the demodulated information signal (F) in waveform, which correspond to (B); and (H) represents a digital signal obtained by demodulating the modulated signals (G), which represents the original information.

In the process described above the modulating signal (B) is formed, basing on the digital signal (A), according to the following principle.

(i) If a digital signal (A) is 1, the polarity (phase) just before it is inversed.

(ii) If a digital signal (A) is 0, the polarity just before it is maintained.

In addition the DPSK signal (D) is formed by varying the polarity of the carrier (C), basing on the modulating signal (B) thus obtained, according to the same principle as described above.

In the DPSK modulation mentioned above, demodulation errors are prevented, even if the phase of the reproduced carrier (E) is more or less shifted at the moment of the demodulation, because the system is so constructed that the carrier (C) is phase-modulated.

Figure 2:
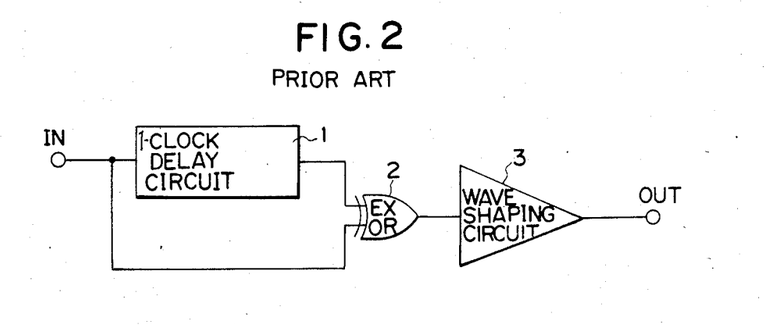
FIGS. 2 and 3 are block diagrams showing the construction of a prior art PSK demodulator.

The digital signal (H) can be obtained by using a simple logic circuit as indicated in FIG. 2, starting from the modulated signal (G) reproduced as described above. In FIG. 2, IN indicates the input terminal; OUT shows the output terminal; 1 is a one-clock delay circuit; 2 is an exclusive OR gate; and 3 is a wave shaping circuit.

Figure 3:
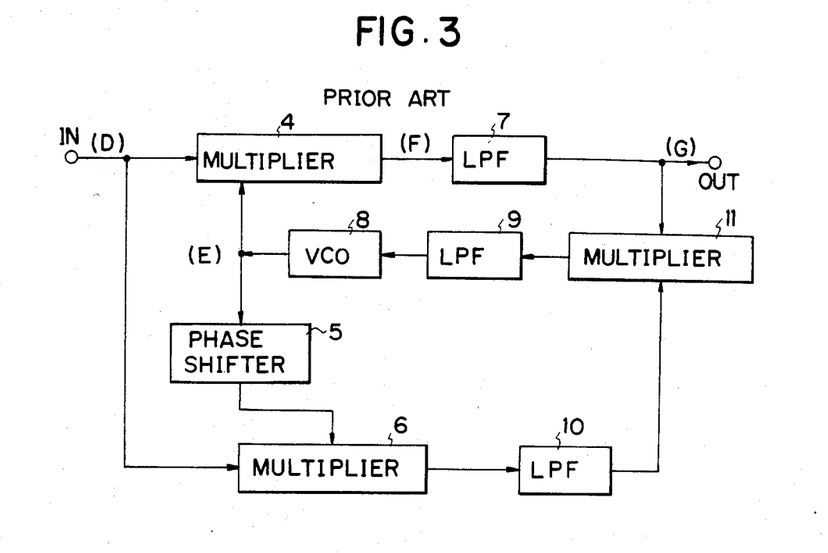

Further, the carrier (E) mentioned above can be easily obtained by using a well-known Costas loop circuit as indicated in FIG. 3. In FIG. 3, IN indicates the input terminal; OUT shows the output terminal; 4, 6 and 11 are multipliers; 5 is a 90° phase shifter; 7, 9 and 10 are low pass filters; and 8 is a voltage controlled oscillator (VCO). To the input terminal IN is applied the DPSK signal (D) and from the output terminal OUT is obtained the modulated signal (G). In addition, the carrier (E) mentioned above is obtained from the VCO 8 and further the demodulated information signal (F) is obtained from the multiplier 4.

In this way, it is possible to effect easily the demodulation of the DPSK signal by reproducing the carrier (E) at the receiver side and multiplying the received DPSK signal (D) by it.

Consider now the case where the inputted DPSK signal is burst wave.

Figure 4:
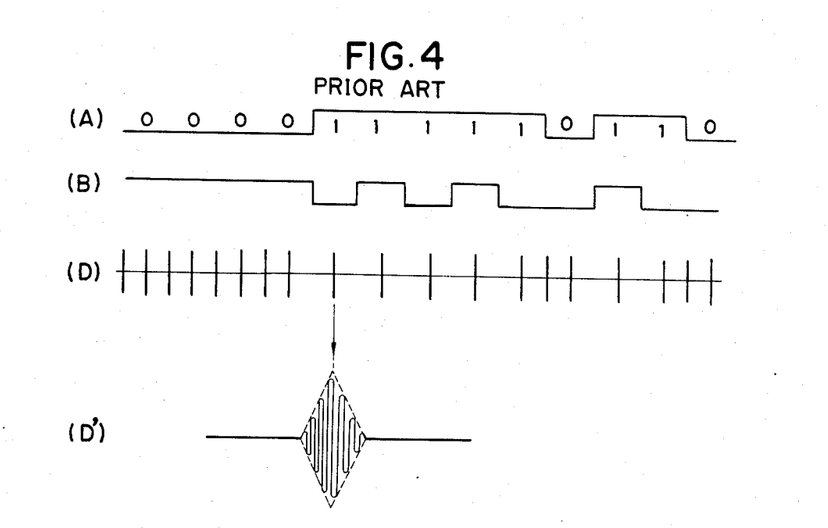

FIG. 4 (A), (B) and (D) indicate waveforms corresponding to those shown in FIG. 1 and FIG. 4 (D') is a part of (D) with an enlarged time scale representing a waveform in the case where the inputted DPSK signal (D) is a burst wave.

The characteristic points of the DPSK signal (D') in FIG. 4 are as follows.

(i) The phase of the burst wave is inversed in the same way as the DPSK signal (D), corresponding to 1 and 0 in the modulating signal (B).

(ii) The burst wave does not exist at the points where the modulating signal (B) changes as 1→0 or 0→1. Consequently the period of the burst wave is not constant.

It is conceivable to effect the demodulation operation for such a burst DPSK signal (D') just as described above, by using a Costas loop indicated in FIG. 3.

However, since the burst DPSK signal (D') is a burst wave, the signal is 0 in almost all the time intervals. Consequently the control voltage of the VCO 8 is extremely small. As a result, the VCO 8 cannot work effectively and this makes it very difficult to reproduce the carrier.

In consequence, for the burst DPSK signal it is not possible to demodulate it by the carrier reproduction method.

SUMMARY OF THE INVENTION

This invention has been done from the point of view described above, and the object of this invention is to provide a PSK demodulator effecting the demodulation operation, even if PSK signals such as burst DPSK signals are inputted.

This invention is characterized by a PSK demodulation, which comprises a local oscillator circuit working asynchronously with respect to the carrier phase of an inputted burst PSK signal. A carrier phase information detection means includes first and second multipliers for multiplying a first output signal obtained from said local oscillator circuit and a second output signal shifted in phase by 90° with respect to this first output signal, respectively, by said inputted burst PSK signal. A signal level discriminator means having a first reference voltage and a second reference voltage which is lower than said first reference voltage classifies output signals coming from said first and second multipliers into a total of 4 sorts of signals, those which are higher than said first reference voltage and those which are lower than said second reference voltage, by comparing said output signals with said first and second reference voltages.

Said signal level discrimination means is so constructed that said inputted PSK signal is demodulated by using said 4 sorts of signals.

Hereinbelow an embodiment according to this invention will be explained, referring to the drawings.

DESCRIPTION OF A PREFERRED EMBODIMENT

Figure 5:
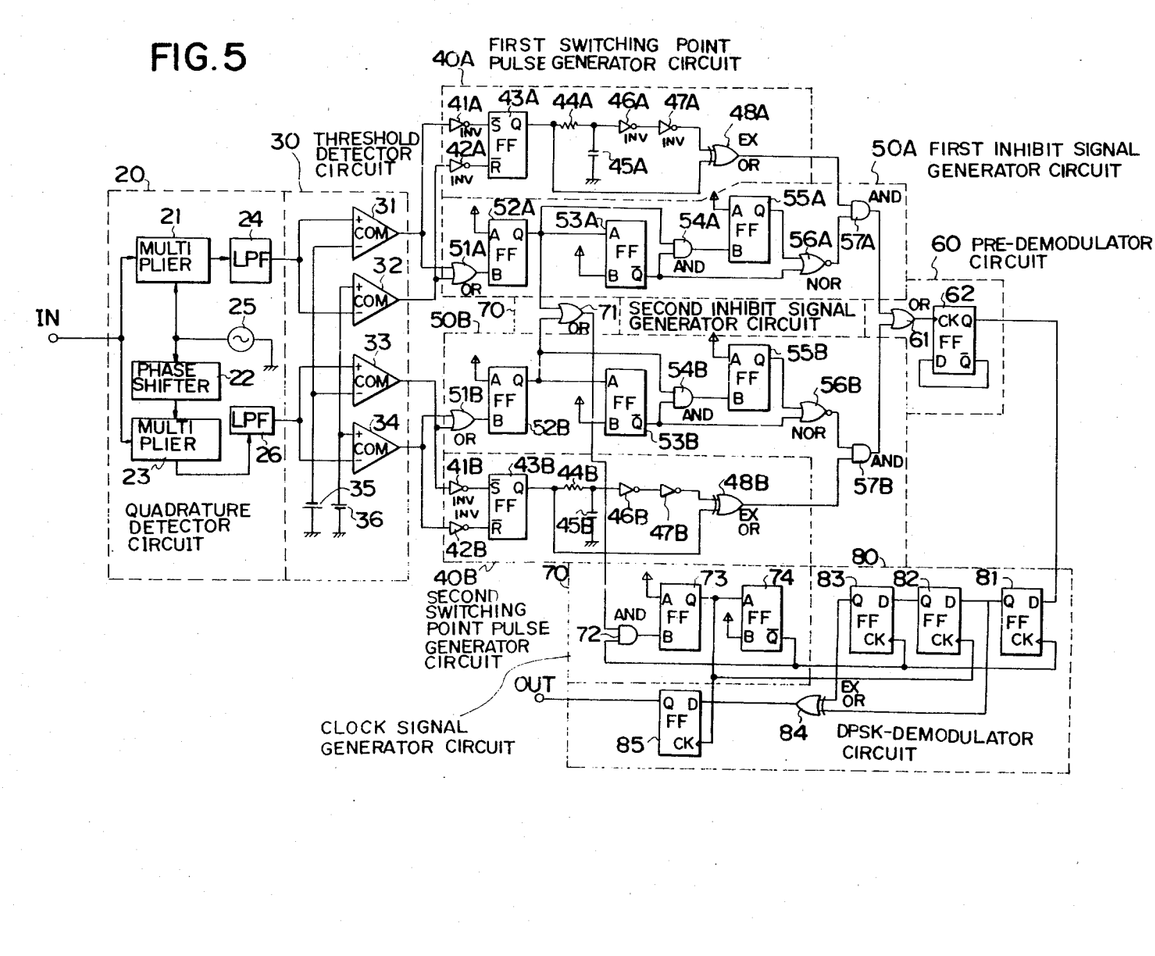
FIG. 5 is a block diagram showing the construction of a PSK demodulator according to this invention.

FIG. 5 is a block diagram showing the construction of a DPSK demodulator, which is an example of the PSK demodulator according to this invention, in which the reference numeral 20 indicates a quadrature detector circuit; 30 is a threshold detector circuit; 40A and 40B are switching point pulse generator circuits, 50A and 50B are inhibit signal generator circuits; 60 is a pre-demodulator circuit; 70 is a clock signal generator circuit; and 80 is a DPSK demodulator. In these circuits, the reference numerals 21 and 23 represent multipliers; 22 is a 90° phase shifter; 24 and 26 are low pass filters; 25 is a local oscillator; 31 to 34 are comparators; 35 and 36 are reference voltage sources; 41A, 41B, 42A, 42B, 47A and 47B are inverters; 46A and 46B are Schmitt trigger circuits; 44A and 44B are resistances; 45A and 45B are capacitors; 43A and 43B are set-reset type flipflops; 48A, 48B and 84 are exclusive OR gates; 52A, 52B, 53A, 53B, 55A, 55B, 73 and 74 are monostable multivibrators; 54A, 54B, 57A, 57B and 72 are AND gates; 51A, 51B, 61 and 71 are OR gates; 56A and 56B are NOR gates; 62, 81 to 83, and 85 are D-type flipflops.

Figure 6:
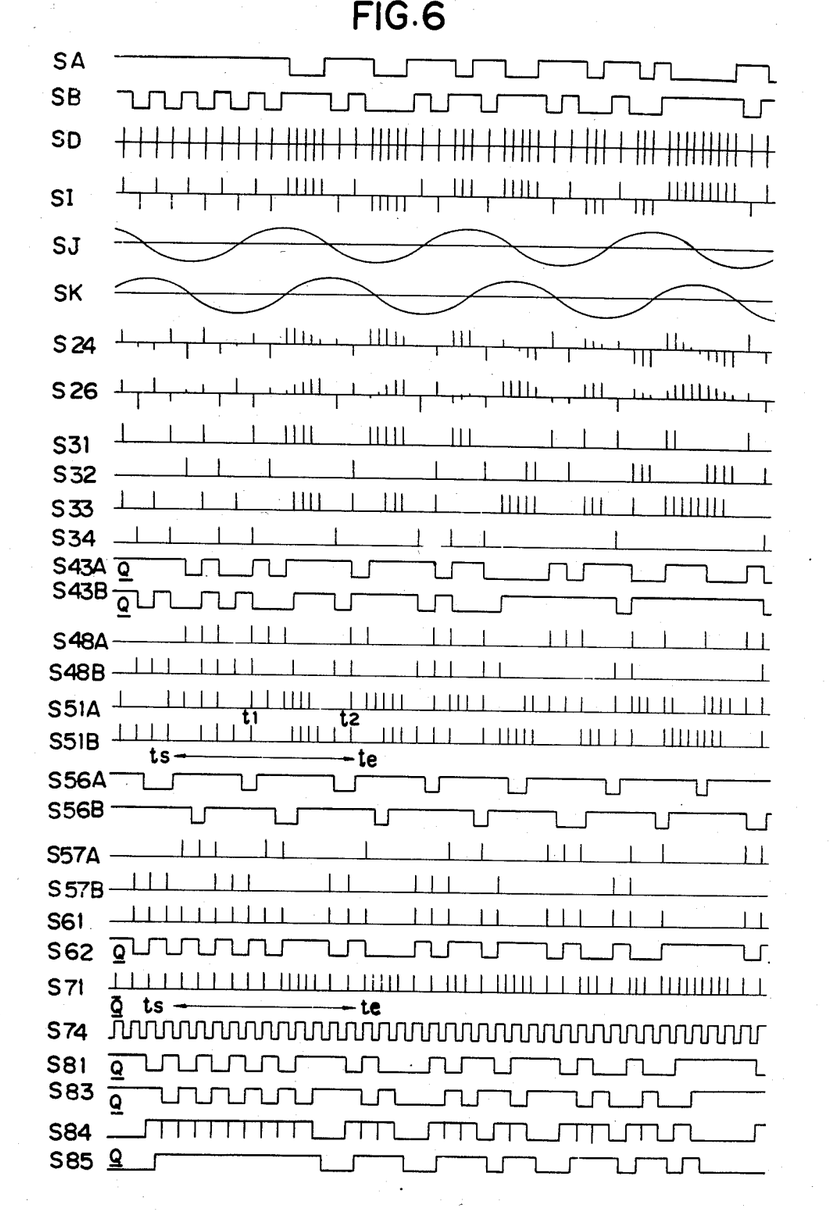
FIGS. 6, 7 and 8 show waveforms for explaining the principle of the PSK demodulation according to this invention.

FIG. 6 shows waveforms obtained in constituting members described above, in which $S_A$, $S_B$ and $S_D$ correspond to (A), (B) and (D) in FIG. 4.

Before explaining the working mode of the DPSK demodulator according to the embodiment of this invention indicated in FIG. 5, the principle of this invention will be explained.

When the burst DPSK signal $S_D$ in FIG. 6 is applied to the input terminal IN of the DPSK demodulator indicated in FIG. 5, in the case where the phase (and the frequency) of the signal of the local oscillator 25 coincides with the phase of the burst wave of this signal, the signal $S_I$ in FIG. 6 is outputted by the low pass filter 24.

However, since the local osciIator 25 is not controlled so that they coincide with each other, it should be considered that the carrier phase of the burst wave is different from that of the signal of the local oscillator 25.

In general, when 2 sinusoidal signals having different phases or frequencies are multiplied by each other, at the output is obtained a sinusoidal signal having a frequency which is equal to the difference between the frequencies of the 2, signals. This can be represented by the following equations.

Suppose that the first sinusoidal signal $V_1$ can be represented by $$V_1 = A \sin\omega_1 t \quad (1)$$

and that the second sinusoidal signal $V_2$ by $$V_2 = B \sin\omega_2 t \quad (2)$$

By multiplying these two signals (1) and (2), differential signals $V_3$ represented by $$V_3 = A \cdot B \sin\omega_1 t \cdot \sin\omega_2 t \quad (3)$$

$$= \left(\frac{A \cdot B}{2}\right) [\cos(\omega_1 - \omega_2)t - \cos(\omega_1 + \omega_2)t]$$

can be obtained. By making this signal $V_3$ pass through a low pass filter, a signal $V_4$ having no component of $(\omega_1 + \omega_2)$, which can be represented by $$V_4 = \frac{A \cdot B}{2} \cos(\omega_1 - \omega_2)t \quad (4)$$

is obtained. This signal $V_4$ can be represented by, $S_{24}$ in FIG. 6.

A signal $V_2'$ having a phase delay of 90° with respect to that shown by (2)

$$V_2' = B \sin(\omega_2 t - \pi/2) = B \cos\omega_2 t \quad (5)$$

is formed as a second sinusoidal signal. Multiplying this (5) by (1), a signal $V_4'$ represented by $$V_4' = \frac{A \cdot B}{2} \sin(\omega_1 - \omega_2)t \quad (6)$$

is obtained at a low pass filter. This signal $V_4'$ can be represented by $S_{26}$ in FIG. 6, which is a signal having a phase shift of 90° with respect to $S_{24}$.

Consequently, in the case where the phase of the inputted burst DPSK signal is different from that of the local oscillator 25 in FIG. 5, as indicated above, the signals obtained by the multipliers 21, 23 and the low pass filters 24, 26 are not those indicated by $S_I$ in FIG. 6, but they are burst waves as indicated by $S_{24}$ and $S_{26}$, which are the results obtained by multiplying $S_J$ and $S_K$ by $S_D$ wherein $S_J$ is the signal from oscillator 25 and $S_K$ is the signal from the phase shifter 22.

By this method, it is possible to obtain outputs which are complementary to each other, as indicated by $S_{24}$ and $S_{26}$, from the first and second multipliers 21, 23, by multiplying the signal from the local oscillator 25 working asynchronously with respect to the carrier phase of the burst carrier wave and the signal whose phase is shifted by 90° with respect to the signal from the local oscillator by the inputted burst DPSK signal in the first multiplier 21 and the second multiplier 23, respectively. That is, they vary complementarily to each other so that, when one of these signals decreases, the other increases. This complementary relation is valid, when the difference between the frequency of the carrier of the burst wave and that of the signal coming from the local oscillator 25 is small.

Consequently, it can be said that, according to this invention, the demodulation operation is effected by utilizing such a complementary relation of the burst wave as a fundamental principle.

Hereinbelow the working mode of the DPSK demodulator according to an embodiment of this invention is described, referring to FIG. 5.

The signals $S_{24}$ and $S_{26}$ outputted by the low pass filters 24 and 26, respectively, in the demodulation circuit 20 are applied to the comparators 31, 32 and 33, 34 in the threshold detector circuit 30. The signals $S_{24}$ and $S_{26}$ applied to the comparators 31 and 33 are compared with the positive reference voltage 35 and only the components which are higher than the voltage 35 are transformed into H (high level) signals, which are outputted in the form of $S_{31}$ and $S_{33}$, respectively. On the other hand, the signals $S_{24}$ and $S_{26}$ applied to the comparators 32 and 34 are compared with the negative reference voltage 36 and only the components which are lower than the voltage 36 are transformed into H signals, which are outputted in the form of $S_{32}$ and $S_{34}$, respectively.

In this way, the burst components of $S_{24}$ and $S_{26}$ are classified into 4 sorts of digital signals and outputted.

$S_{31}$ and $S_{32}$ among the 4 sorts of signals $S_{31}$ to $S_{34}$ are applied to the first switching point pulse generator circuit 40A and to the first inhibit signal generator circuit 50A and to the contrary, $S_{33}$ and $S_{34}$ are applied to the second switching point pulse generator circuit 40B and to the second inhibit signal generator circuit 50B. Since the working mode of the second circuits 40B, 50B is identical to that of the first circuits 40A, 50A, hereinbelow only the first circuits 40A, 50A will be explained.

Both the signals $S_{31}$ and $S_{32}$ applied to the inverters 41A and 42A in the first switching point pulse generator circuit 40A are, after their polarity has been inverted, applied to the set terminal $\bar{S}$ and the reset terminal $\bar{R}$ in the set-reset type flipflop 43A. The flipflop 43A outputs a H level pulse, when $S_{31}$ has the H level, and a L (low) level pulse, when $S_{32}$ has the H level, such as $S_{43A}$. The signal $S_{43A}$ is divided and led along 2 ways, one of which is inputted to the exclusive OR gate 48A and the other of which is inputted to the exclusive OR gate 48A stated above after having passed through an integrating circuit consisting of a resistor 44A and a capacitor 45A and having been wave-shaped by passing through the Schmitt trigger circuit 46A and the invertor 47A. In this way, a switching point pulse such as $S_{48A}$ is obtained at the output of the exclusive OR gate, which pulse is generated corresponding to a polarity changing point in said signal $S_{43A}$. This switching point pulse $S_{48A}$ is generated at the timing only when said signals $S_{31}$ and $S_{32}$ are alternatively applied.

The signals $S_{43B}$ and $S_{48B}$ are obtained by the same manner at the output of the set-reset type flipflop 43B and at the output of the exclusive OR gate 48B, respectively, in the second switching point pulse generator circuit 40B.

The signals $S_{48A}$ and $S_{48B}$ outputted by the first and second switching point pulse generator circuits 40A and 40B contain totally the carrier pulse information for demodulating the modulated $S_B$, but they contain information of the signals $S_J$ and $S_K$ together with it. Consequently it is not possible to demodulate directly the signals $S_{48A}$ and $S_{48B}$ mentioned above, but it is necessary to remove the unnecessary components coming from said signals $S_J$ and $S_K$ from these signals.

The first and second inhibit signal generator circuits 50A and 50B generate inhibit signals for removing these unnecessary components.

Figure 7:
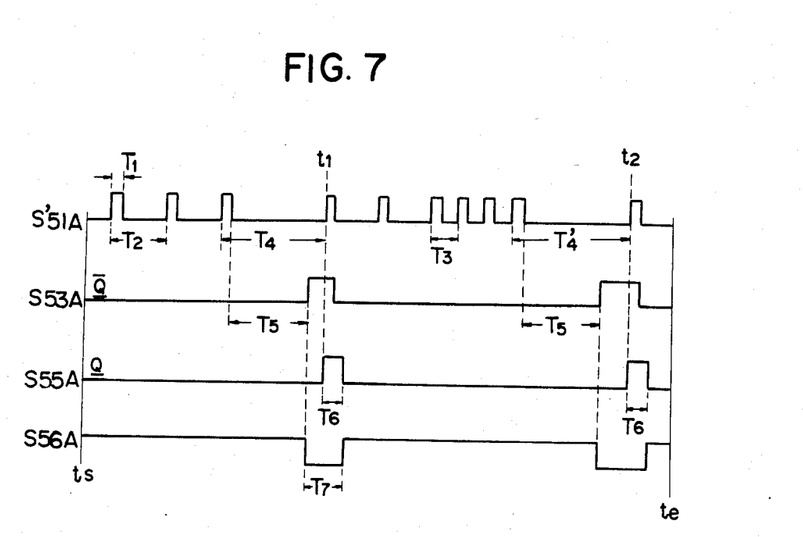

The signals $S_{31}$ and $S_{32}$ applied to the OR gate 51A in the first inhibit signal generator circuit 50A form the signal $S_{51A}$ which is their logic sum. Then the signal $S_{51A}$ thus formed is applied to the monostable multivibrator 52A and its width $T_1$ is enlarged as indicated with $S_{51A}'$ in FIG. 7. Signals from $t_s$ to $t_e$ shown in FIG. 6 are indicated in FIG. 7 with an enlarged scale in time. By this way subsequent reliable work can be expected.

The signal $S_{51A}'$ is applied to the second monostable multivibrator 53A to form a signal $S_{53A}$. This last signal $S_{53A}$ is further applied through the AND gate 54A to the third monostable multivibrator 55A to form a signal $S_{55A}$.

The signals $S_{53A}$ and $S_{55A}$ are applied to the NOR gate 56A, which outputs a signal $S_{56A}$ in FIG. 7, i.e. inhibit signal.

In principle, the generation timing of the inhibit signal is chosen to be that of the first pulse, after the pulse interval of the signal $S_{51A}'$ has become longer than the longer one between 2 sets of intervals, long and short ($T_2$, $T_3$), of the inputted burst wave.

However, in practice, the inputted wave has not pulses correctly arranged, but is lacking in some pulses, because it is multiplied by the output of the local oscillator 25, which is asynchronous with respect to the carrier phase, and level discrimination is effected by the threshold detector circuit 30, as stated above. Due to this fact, pulse intervals $T_4$, $T_4'$, which are longer than the pulse intervals $T_2$, $T_3$ in the original burst wave, can appear and thus inhibit signals, which inhibit the output of the first pulse appearing after such a long interval, are outputted.

Since the second multivibrator 53A is triggered by the falling edge of a pulse of the signal $S_{51A}'$ but it has a time constant $T_5$, its output becomes H level only after the lapse of time of $T_5$, as indicated by $S_{53A}$, and L level at the falling edge of the following pulse. When the pulse interval $T_2$ in the signal $S_{51A}'$ is shorter than $T_5$, since the multivibrator 53A is continuously triggered before the signal 53A becomes H level, it becomes never H level. $T_5$ is so determined that the relationship $2T_2 > T_5 > T_2$ is satisfied.

The third multivibrator 55A is triggered at a point of time $t_1$ by the rising edge of a pulse in the signal $S_{51A}'$, and its output signal becomes H level only during a time interval $T_6$, as indicated by $S_{55A}$.

The NOR gate, to which the signals 53A and 55A are applied, outputs an L level pulse only during a time interval $T_7$, as indicated by the signal $S_{56A}$ and the time interval $T_7$ contains, with a sufficient margin, timing for generating an inhibit pulse at the point of time $t_1$.

The inhibit signal, which is the signal $S_{56A}$ thus obtained, is applied to the AND gate 57A together with the switching point pulse signal $S_{48A}$ obtained by the exclusive OR gate 48A and the AND gate 57A outputs a signal $S_{57A}$, which is the logic product of the inputted signals.

By the same way the NOR gate 56B in the second inhibit signal generator circuit 50B outputs a signal $S_{56B}$ and the AND gate 57B outputs a signal $S_{57B}$.

Consequently the signals $S_{57A}$ and $S_{57B}$ are signals obtained by removing perfectly the signals $S_J$ and $S_K$, which are unnecessary components, from the signals $S_{48A}$ and $S_{48B}$, respectively.

The signals $S_{57A}$ and $S_{57B}$ outputted by a pair of the AND gates 57A and 57B mentioned above are applied to an OR gate 61 in a pre-demodulator circuit, which forms the logic sum of the inputted signals and outputs a signal $S_{61}$.

Then this signal $S_{61}$ is applied to a D-type flipflop 62, which outputs a signal $S_{62}$. This signal $S_{62}$ is a signal obtained by the fact that the modulating signal $S_B$ mentioned above is delayed and reproduced. That is, the modulating signal $S_B$ has been demodulated by said flipflop 62. In addition, in the practical work of the circuit, the modulating signal $S_B$ is outputted, being delayed with respect to the information signal $S_A$, as indicated in FIG. 6.

Said signal $S_{62}$ is applied to a DPSK demodulator circuit 80 and the information signal $S_A$ is demodulated by using a clock signal from a clock signal generator circuit 70.

Said DPSK demodulator circuit 80 corresponds to the logic circuit in FIG. 2 and consequently necessitates the function corresponding to the one-clock delay 1. Although it is conceivable therefor to use an LC distributed constant circuit or a charge coupled device, since the object to be delayed is a digital signal (pulse signal), it is simple to utilize a logic circuit for it. For this purpose it is necessary to reproduce the clock signal synchronized with the inputted signal (not the carrier). On the other hand, since the repetition period of the inputted burst wave is not constant, it is necessary to generate a clock signal having a constant period.

The clock signal generator circuit 70 is disposed for this purpose and generates a clock pulse signal having a constant period, basing on a pulse signal having a period, which is not constant.

Figure 8:
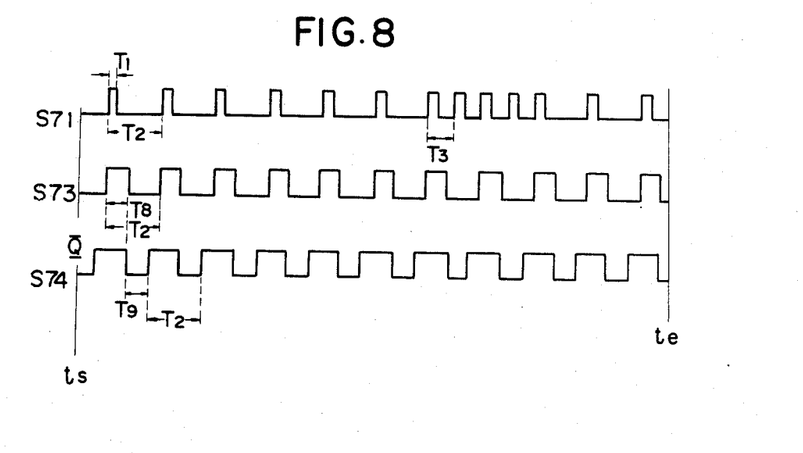

The signals $S_{52A}$ and $S_{52B}$ outputted by the monostable multivibrators 52A and 52B in the first and second inhibit signal generator circuits 50A and 50B, respectively, are applied to the OR gate 71 in the clock signal generator circuit 70, which forms a logic sum of the signals and outputs a signal $S_{71}$. Since said signals $S_{52A}$ and $S_{52B}$ contain the 4 sorts of signal components $S_{31}$ to $S_{34}$ mentioned above, the OR gate 71 has formed a logic sum of these 4 sorts of signals. FIG. 8 shows said signal $S_{71}$ with an enlarged time scale for a period of time from $t_s$ to $t_e$. The pulse period is either $T_2$ or $T_3$ and $T_2=2T_3$. Said signal $S_{71}$ is applied through an AND gate 72 to a first monostable multivibrator 73 and this multivibrator 73 is triggered by the rising edge of a pulse in the signal $S_{71}$ and outputs a signal $S_{73}$, which has the H level only during an interval $T_8$. This signal $S_{73}$ is applied to a second monostable multivibrator 74 and this multivibrator 74 is triggered by the rising edge of a pulse in the signal $S_{73}$ and outputs a signal $S_{74}$, which has the L level only during an interval $T_9$. This signal $S_{74}$ is applied to the other input of the AND gate 72.

As indicated above, by driving the first and second monostable multivibrators 73, 74 and the AND gate 72, clock signals $S_{73}$ and $S_{74}$ having a constant period $T_2$ synchronized with the period of the inputted burst wave can be obtained at both said multivibrators 73 and 74.

The signal $S_{62}$ corresponding to the modulating signal $S_B$, which is outputted by the D-type flipflop 62, is applied to a first D-type flipflop 81, which outputs a signal $S_{81}$. This signal $S_{81}$ is applied to a second D-type flipflop 82, whose output is further applied to a third D-type flipflop 83. This flipflop 83 outputs a signal $S_{83}$.

Since two-phase clock signals $S_{73}$ and $S_{74}$ outputted by said multivibrators 73 and 74 are applied to the second D-type flipflop 82 and to the first and third D-type flipflops 81, 83, respectively, the signal $S_{83}$ outputted by the third D-type flipflop 83 is a signal obtained by delaying by one clock the output signal $S_{81}$ of the first D-type flipflop 81. Consequently, when these signals $S_{81}$ and $S_{83}$ are applied to a NOR gate 84, this NOR gate 84 outputs the information signal $S_A$ obtained by demodulating said modulating signal $S_B$.

In this work of the circuits the timings of the rising and the falling of pulses in the signals $S_{81}$ and $S_{83}$ outputted by said first and second D-type flipflops 81 and 83 can be delicately different. In this case, there is a risk to produce an erroneous output at the NOR gate 84, what gives rise to a so-called spike. Consequently, in order to secure the demodulation work, this spike is removed by disposing a D-type flipflop 85 after the NOR gate 84, to which flipflop the signal $S_{84}$ coming from the NOR gate 84 is applied together with the signal $S_{73}$ coming from said monostable multivibrator 73 and by driving said D-type flipflop 85 with the timing of the clock signal $S_{73}$. By this way it is possible to secure the demodulation work and to obtain the demodulated signal $S_{85}$ corresponding to the information signal $S_A$ at the output terminal OUT. As explained above, according to this invention, since the PSK demodulator comprises a local oscillator circuit working asynchronously with respect to the carrier phase of an inputted burst PSK signal, carrier phase information detection means including the first and second multipliers for multiplying the first output signal obtained from said local oscillator circuit and the second output signal shifted in phase by 90° with respect to this first output signal, respectively by said inputted burst PSK signal, and signal level discriminator means having the first reference voltage and the second reference voltage which is lower than said first reference voltage and classifying output signals coming from said first and second multipliers into a total of 4 sorts of signals, those which are higher than said first reference voltage and those which are lower than said second reference voltage, by comparing said output signals with said first and second reference voltages, and is so constructed that said inputted PSK signal is demodulated by using said 4 sorts of signals, even in the case where the received PSK signal is a burst wave, it is possible to demodulate information without reproducing the carrier.

In particular, according to this invention, even if the period of the burst wave is not constant, since a clock signal having a constant period and synchronized with the period of this burst wave can be generated, it is possible to carry out effectively the demodulation of the burst PSK signal.

The embodiments of the invention in which an exclusive property or privilege is claimed are defined as follows:

1. A PSK demodulator comprising:
   a local oscillator circuit working asynchronously with respect to the carrier phase of an inputted butst PSK signal;
   carrier phase information detection means including first and second multipliers for multiplying a first output signal obtained from said local oscillator circuit and a second output signal shifted in phase by 90 degrees with respect to the first output signal, respectively, by said inputted burst PSK signal;
   a reference voltage source generating a first reference voltage and a second reference voltage which is lower than the first reference voltage;
   signal level discriminator means generating 4 sorts of level signals, 2 of which are produced when the output signal from said first multiplier is higher than the first reference voltage and another 2 of which are produced when the output signal from said second multiplier is lower than the second reference voltage, by comparing the output signals of the first and second multipliers with the first and second reference voltages; and PSK circuit means for demodulating the inputted burst PSK signal, based on said 4 sorts of level signals, said PSK circuit means including:

first and second switching point pulse generator means for generating a pulse, every time respective 2 sorts of signals corresponding to the output signals coming from said first and second multipliers are applied alternatively thereto;

first and second inhibit signal generator means for generating inhibit pulses having a predetermined width, when the period of pulses obtained by logically adding said respective 2 sorts of signals is longer than a predetermined period of time;

first logic multiplication means for logically multiplying the output of said first switching point pulse generator means by that of said first inhibit signal generator means;

second logic multiplication means for logically multiplying the output of said second switching point pulse generator means by that of said second inhibit signal generator means;

first logic addition means for logically adding the outputs of said first and second logic multiplication means; and clock signal generating means for generating clock pulses having a constant period;

modulating signal demodulation means for generating pulses whose polarity is inversed in response to said clock pulses, every time a pulse output of said logic addition means is applied thereto.

2. PSK demodulator according to claim 1, wherein said clock signal generating means include:

second logic addition means (71) for logically adding said 4 sorts of level signals corresponding to the output signals of said first and second multipliers;

a first flipflop (73) triggered by the output of said second logic addition means and generating pulses having a constant period;

a second flipflop (74) triggered by the output of said first flipflop and generating pulses having said constant period; and an AND gate (72) to which the output of said second logic addition means and the outputs of said second flipflop are inputted.

* * * * *